Figure 1:
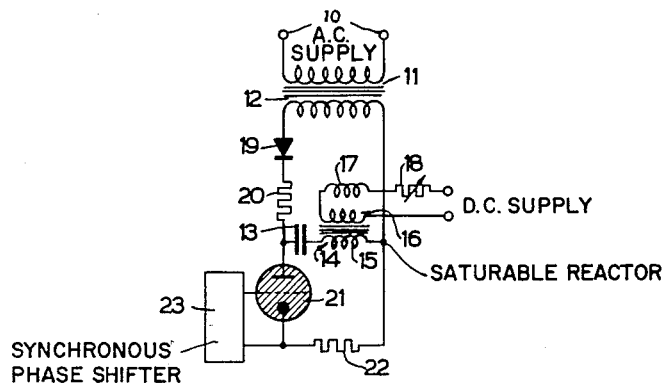

Dec. 4, 1956     E. H. F. W. ROLF     2,773,184

CONSTANT-CURRENT PULSE GENERATOR

Filed Sept. 4, 1952

Inventor:
ERICH H. F. W. ROLF

United States Patent Office 2,773,184
Patented Dec. 4, 1956

2,773,184
CONSTANT-CURRENT PULSE GENERATOR

Erich H. F. W. Rolf, Nurnberg, Germany, assignor to Siemens-Schuckertwerke Aktiengesellscaft, Berlin-Siemensstadt, Germany, a corporation of Germany Application September 4, 1952, Serial No. 307,745

Claims priority, application Germany September 10, 1951

7 Claims. (Cl. 250—27)

My invention relates to electric circuits for the generation of repetitive current pulses of constant magnitude, and has for its main object to devise a pulse generator of this type which readily permits setting or shifting the starting moments of the constant-current pulses or/and controlling their current magnitude with the aid of circuit means of simple design and reliable constancy.

To this end, my invention makes use of the known fact that a current wave can be so modified by a saturable reactor (transductor) that the current amplitude remains constant during those intervals of the wave period in which the magnetization of the reactor reverses from saturation of one polarity to saturation of the other polarity.

According to my invention, I arrange the main winding of a saturable and premagnetized reactor in series with a capacitor, and I connect this series arrangement to a charging circuit of an alternating-voltage source with a series connected electric valve, preferably of the non-controllable type such as a barrier-layer rectifier, while connecting parallel to the reactor-capacitor arrangement a discharging circuit with a controllable valve.

Figure 2:
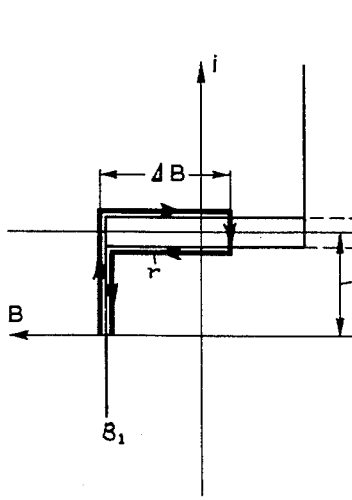
Figure 3:
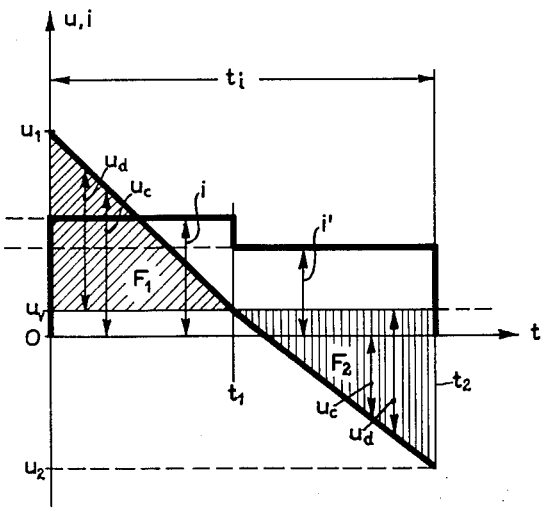

These and more specific features of the invention are apparent from the embodiment described in the following with reference to the drawing in which:

Fig. 1 shows an example of a constant-current pulse generator according to the invention; and Figs. 2 and 3 are respective coordinate diagrams explanatory of the operation of the generator.

The device according to Fig. 1 is energized from terminals 10 through a transformer whose primary and secondary are denoted by 11 and 12 respectively. The terminals 10 are to be connected to an alternating-current source, for instance, of the customary line frequency of 50 or 60 C. P. S. A capacitor 13 is series connected with the main or load winding 15 of a saturable reactor (transductor) 14. The magnetizable core of the reactor is equipped with a premagnetizing winding 16. The series arrangement of capacitor 13 and reactor winding 15 is connected into a charging circuit which is energized from the transformer secondary winding 12 and includes in series a unidirectionally conductive valve 19 and a resistor 20 for limiting the charging current. Valve 19 is of the non-controllable or two-electrode type and consists preferably of a barrier-layer diode rectifier. A discharge circuit, connected in parallel with the series arrangement of capacitor 13 and reactor winding 15, comprises a controllable discharge tube 21 and a load, for instance, a winding or a resistor 22 in series with tube 21. Tube 21 consists preferably of a thyratron. Its grid control circuit 23 may consist of any suitable synchronous control means or phase shifter for adjusting or varying the phase position of the ignition time points of tube 21, such grid circuits being well known and customary for thyratrons. The premagnetizing circuit for the winding 16 of the saturable reactor 14 comprises a smoothing and stabilizing choke coil 17 and an adjusting resistor 18. The terminals of this circuit are connected to a suitable direct-current source of constant voltage. The premagnetizing current in the circuit of winding 16 is so adjusted that the core of reactor 14 is saturated beyond the knee of its magnetization characteristic.

Fig. 2 shows schematically the magnetization characteristic of the saturable reactor with an idealized, rectangular shape of the hysteresis loop. The axis of the magnetic induction B extends toward the left, and the axis of the excitation current $i$ (in winding 15) points upwardly. Due to the premagnetization of the reactor core by the constant premagnetizing current $i_g$ (effective in winding 16), the magnetization loop is displaced upwardly by the amount of premagnetization. The intersection $B_1$ of the magnetization characteristic with the B axis designates the magnetic starting condition of the saturable reactor when the current in the main winding 15 is zero. During a positive half wave of the alternating voltage the capacitor 13 is charged through valve 19 up to an initial voltage ($u_1$) (Fig. 3) which is smaller than the peak value of the energizing alternating voltage by the amount of the voltage drop in valve 19. The charging current flows also through the main winding 15 of the reactor but has a magnetizing effect of the same direction as the premagnetizing current and hence corresponds to a negative excitation according to Fig. 2. Consequently, the saturable reactor remains saturated whereby the waveform of the current in the main winding 15 is not affected. After the termination of the charging current the saturable reactor 14 is in the above-mentioned starting condition.

The time curves of the current $i$ and of the voltage in the discharging circuit are shown in Fig. 3 in dependence upon time $t$. After the ignition of the discharge tube 21 which occurs at a selected time point during the negative half wave of the energizing alternating current depending upon the parameters or adjustment of the grid control circuit or phase shifter 23, the discharge current in the main winding 15 of the saturable reactor has such a direction that it acts in opposition to the premagnetization caused by the control current $i_g$ flowing in winding 16. As a result, the reactor 14 reaches the unsaturated condition thus limiting the magnitude of the capacitor discharge current $i$ to the value required for just balancing the premagnetization plus an amount corresponding to half the width of the magnetization loop.

For simplifying the consideration of the voltage curve it may first be assumed that the voltage across the load 22 is negligible in comparison with the other voltages, i. e. that the discharging side of the device operates practically under short-circuit conditions. Then the voltage $u_c$ of the capacitor, due to the constant magnitude of the discharge current, declines from the value $u_1$ along a straight line down to the value $u_v$ of the arc voltage or internal voltage drop of valve 21, the value $u_v$ being reached at the moment $t_1$. The area $F_1$, marked in Fig. 3 by slanted cross hatching, between the horizontal $u_v$ and the voltage curve represents the voltage-time integral which effects the change in the magnetizing condition of the reactor. The cross section of the magnet core and the number of turns of the main winding 15 are adapted to the magnitude of the energizing voltage so that the voltage integral corresponding to the area $F_1$ does not suffice to reversely magnetize the reactor completely from one saturation condition to saturation of the opposite polarity. According to Fig. 2 it is assumed that the magnetization changes by the amount of $\Delta B$. Hence, the core of the saturable reactor is magnetically charged with this amount of energy, corresponding to the area $F_1$.

Beginning with the time point $t_1$, this performance reverses into a discharge of the magnetic energy stored in the reactor. During the reversing of the magnetization, the operating point of the reactor passes through the lower portion $r$ of the magnetization loop in the direction of the arrows entered on that loop in Fig. 2. Consequently, the discharge current is reduced by an amount corresponding to the vertical width of the loop, and remains constant at the smaller magnitude $i'$ (Fig. 3) until the transductor is again saturated in the original direction. This requires a voltage integral which corresponds to the vertically cross-hatched area $F_2$ and is equal to the area $F_1$. While the reversed magnetization is being built up, the voltage follows again a linear course but, due to the reduced current value, has a reduced slant until the final voltage value $u_2$ is reached at the time point $t_2$. This time point $t_2$ is definitely determined by the magnitude of the area $F_2$ and the inclination of the voltage line. At the time point $t_2$ the current $i$ returns to the zero value and the discharge tube 21 becomes non-conductive. Consequently, the entire duration $t_1$ of the current pulse is thus likewise definitely determined.

For clarity of illustration, the diagram of Fig. 2 shows the proportion of the width of the magnetizing loop to the premagnetization current $i_g$ in a purposely exaggerated manner. In reality, this proportion is much smaller so that the current step (between $i$ and $i'$) disappears for all practical purposes and the current may be looked upon as being constant throughout the entire duration $t_1$ of the pulse. The magnitude of this current pulse depends upon that of the premagnetizing current $i_g$ and hence can be adjusted by means of the resistor 18.

While a pulse generator according to the invention is applicable for any control, regulating, signalling or communication purpose where an accurately controllable pulse of constant magnitude is desired, one of the preferred applications to which the invention has so far been put is the control and regulation of the commutation reactors in power-current converters with mechanically or electrically controlled contact devices such as described, for instance, in the copending applications Serial No. 278,385, filed March 25, 1952 of E. Rolf for Electric Contact Converters, Patent No. 2,756,381, granted July 24, 1956, and Serial No. 278,386, filed March 25, 1952 of E. Rolf and M. Belamin for Electric Contact Converters With Electromagnetically Controlled Contacts, both applications being assigned to the assignee of the present invention. In such converting devices, the constant-current pulse of a generator according to my invention may provide a constant component for the make premagnetization of the commutating reactor, the phase position of this pulse to be adapted to the variable degree of voltage control of the current converter. For this purpose, the grid circuit for adjusting the ignition time point of the tube 21 may be mechanically or electrically coupled with the device of the converter equipment for controlling or regulating the output voltage.

It will be understood by those skilled in the art that pulse generators according to the invention may be given various modifications, and may be used in various combinations with other apparatus, other than those specifically shown and mentioned, without departing from the essential features of my invention and within the scope of the claims annexed hereto.

I claim:

1. A constant-current pulse generator, comprising a capacitor and a saturable reactor, said reactor comprising a saturable magnetic core with a load winding inductively coupled thereto, said load winding being connected in series with said capacitor, magnetizing means operatively associated with said core and maintaining a constant magnetomotive force acting thereon at least sufficient to saturate said core, cyclically operative charging means connected to said capacitor for charging said capacitor periodically to a predetermined potential, a load circuit, and circuit control means operating in synchronism with said cyclically operative means, said circuit control means being connected to said load winding and to said capacitor and periodically connecting the series combination of said load winding and said capacitor to said load circuit with said capacitor in a charged condition and disconnecting said series combination therefrom after discharge of said capacitor into said load circuit, the direction of current flow through said load winding during discharge of said capacitor having a polarity which magnetizes said core in opposition to said magnetizing means for desaturating said core during said discharge, whereby said load circuit receives successive pulses of substantially constant current delivered at a repetition rate determined by said cyclically operative means.

2. A constant-current pulse generator, comprising a saturable reactor having a main winding and a premagnetizing winding, a direct-current circuit of normally constant voltage connected to said premagnetizing winding a capacitor forming a series arrangement together with said main winding, alternating-current supply means and a valve series-connected with each other across said arrangement to provide charging current therefor, and a discharge circuit connected in parallel with said arrangement and having load means and a controllable valve series-connected with each other.

3. A constant-current pulse generator, comprising a saturable reactor having a main winding and a premagnetizing winding, a direct-current circuit of normally constant voltage connected to said premagnetizing winding and having adjusting means for controlling the excitation of said premagnetizing winding, a capacitor forming a series arrangement together with said main winding, alternating-current supply means and a two-electrode valve series-connected with each other across said arrangement to provide charging current therefor, a discharge circuit connected in parallel with said arrangement and having load means and a controllable valve series-connected with each other.

4. A constant-current pulse generator, comprising a capacitor and a saturable reactor, said reactor comprising a saturable magnetic core having a rectangular saturation curve and a winding inductively coupled to said core, said winding being connected in series with said capacitor, magnetizing means of constant magnetomotive force acting on said core and maintaining said core in a state of saturation, an alternating current energizing circuit, unidirectionally conductive circuit means connecting the series combination of said capacitor and said winding to said energizing circuit for periodically charging said capacitor to a predetermined potential therefrom, the direction of current flow through said winding during said charging being such that it aids said magnetizing means in maintaining said state of saturation, a load circuit, discharge circuit means including a controllable valve connecting said series combination to said load circuit, and circuit control means connected to said valve and operating in synchronism with said alternating current for rendering said valve conductive to connect said series combination to said load circuit during each cycle of said alternating current with said capacitor in a charged condition.

5. A generator for producing in a load a current pulse of substantially rectangular waveform, comprising a source of alternating current, a saturable reactor, a capacitor connected in series with said reactor, circuit means including said source of alternating current for charging said capacitor, a load circuit in which said load is included, controllable circuit means connecting said load circuit across said series-connected capacitor and reactor for discharging said capacitor through the load, and means for premagnetizing said reactor to a saturation point beyond the knee of its magnetization characteristic.

6. A generator for producing in a load a current pulse of substantially rectangular waveform, comprising a load circuit adapted for connection to said load, a source of alternating current, a saturable reactor, a capacitor connected in series with said reactor, circuit means including said source of alternating current for charging said capacitor, a thyratron having a plate circuit and a control circuit, said plate circuit connecting said load circuit across said series-connected capacitor and reactor for discharging said capacitor through the load under control by said control circuit, and a direct-current circuit inductively linked with said reactor for premagnetizing said reactor to a saturation point beyond the knee of its magnetization characteristic.

7. A generator for producing a current pulse of substantially rectangular waveform in a load circuit, comprising a source of alternating current, a saturable reactor, a capacitor connected in series with said reactor, circuit means including said source of alternating current for charging said capacitor, a load circuit, a thyratron having a plate circuit and a control circuit, said plate circuit connecting said load circuit across said series-connected capacitor and reactor for discharging said capacitor through said load circuit under control by said control circuit, said control circuit being synchronous with said alternating current, and means for premagnetizing said reactor to a saturation point beyond the knee of its magnetization characteristic, said premagnetization being of opposite sense with respect to the magnetization thereof effected by the discharging of said series-connected capacitor and reactor.

References Cited in the file of this patent
UNITED STATES PATENTS

| | | |
|---|---|---|
| 2,272,756 | Summers | Feb. 10, 1942 |
| 2,289,321 | Collom | July 7, 1942 |
| 2,372,005 | Kinsman | Mar. 20, 1945 |
| 2,405,575 | Hayes et al. | Aug. 13, 1946 |
| 2,413,063 | Miller | Dec. 24, 1946 |
| 2,455,373 | Lester | Dec. 7, 1948 |
| 2,646,503 | Winter | July 21, 1953 |